Jan. 5, 1954  J. E. BECKER  2,664,705
FILLING AND EMPTYING FLUID CONTROL MEANS
FOR ROTARY HYDRAULIC COUPLINGS
Filed Aug. 26, 1952
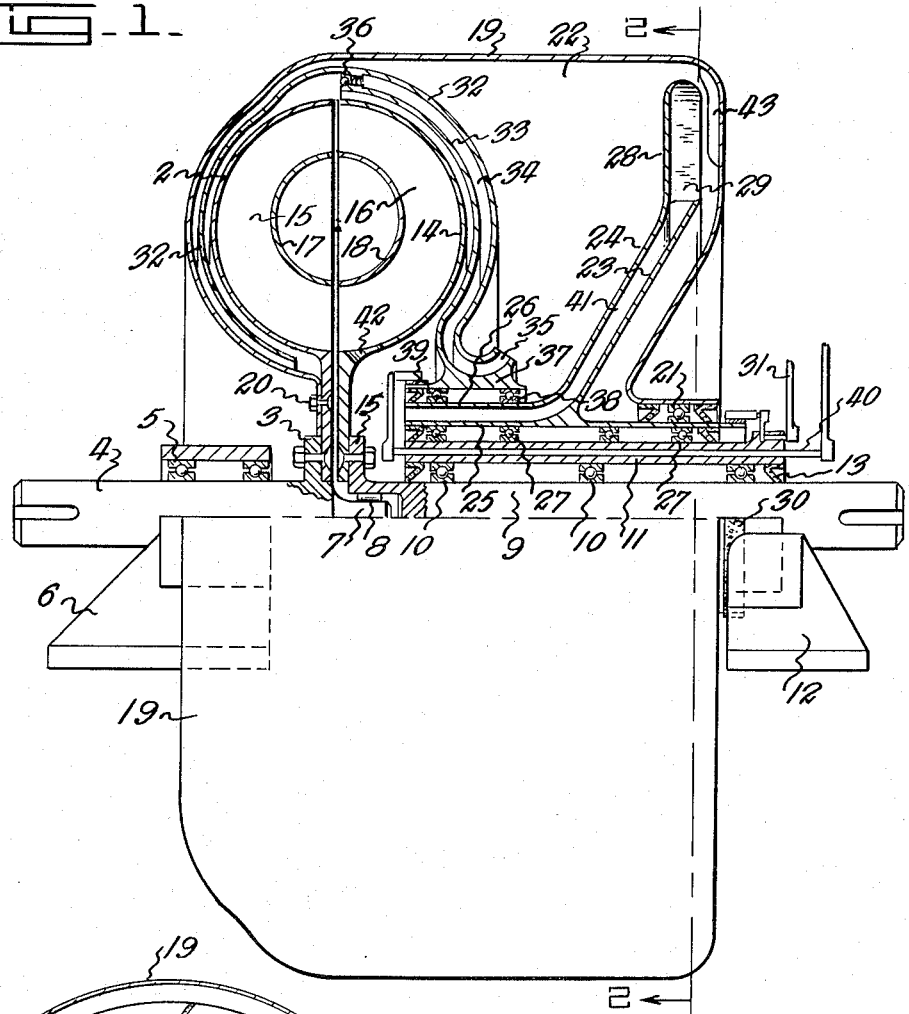
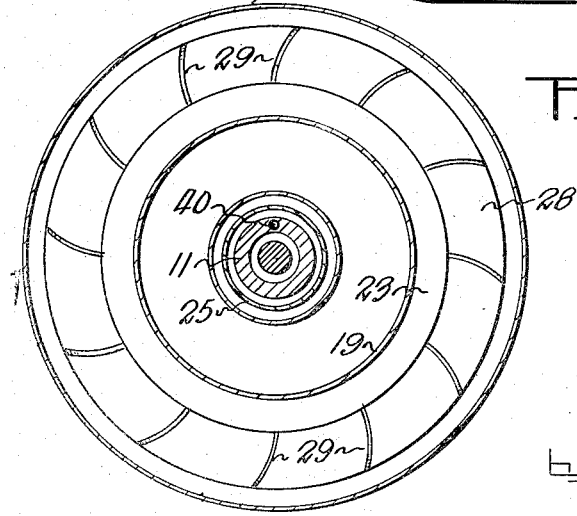
Inventor
John E. Becker Patented Jan. 5, 1954

2,664,705

UNITED STATES PATENT OFFICE 2,664,705

FILLING AND EMPTYING FLUID CONTROL MEANS FOR ROTARY HYDRAULIC COUPLINGS

John Edward Becker, Darlington Township, Durham County, Ontario, Canada

Application August 26, 1952, Serial No. 306,380

6 Claims. (Cl. 60—54)

My invention relates to improvements in fluid circulation controls for fluid couplings of the type wherein an impeller and a runner are contained within an outer housing shell, one part of which shell comprises a rotating fluid reservoir, the fluid being injected into a coupling from the reservoir and removed from the coupling to the reservoir by means of suitable fluid scooping or fluid pumping elements, of the type shown in my copending United States patent application Serial No. 294,108, filed June 17, 1952; and the object of this invention is to furnish a construction wherein the outer shell is attached to the impeller driving shaft for positive rotation therewith, the runner and impeller being contained within a freely mounted inner shell positioned at one end of the outer shell, the rotative movement of the inner shell being controlled by a brake for removal of the fluid from the coupling into the reservoir in the outer shell.

Another object of the invention is to provide a freely rotatable fluid scooping element which is contained within the outer shell and the rotative movement of which is governed by a brake whereby the speed differential between the rotative movement of the outer shell and the rotative movement of the element may be utilized for the injection of fluid from the reservoir into the coupling.

With the foregoing and other objects in view as shall appear, my invention consists of a fluid circulation control for fluid couplings, constructed and arranged all as hereinafter more particularly described and illustrated in the accompanying drawing in which:

Fig. 1 is a side elevational view of the coupling and reservoir assembly, the upper portion thereof being shown in section.

Fig. 2 is a transverse cross-sectional view through the coupling being taken through the line 2—2, Fig. 1, to show the arrangement of the rotatable fluid scooping element.

Like characters of reference indicate corresponding parts in the two views of the drawing.

An impeller shell 2 of ring form is secured to a flange 3 on the inner end of a driving shaft 4 which is carried by a ball race 5 mounted within a coupling supporting bracket 6. The inner end of the driving shaft 4 has a reduced diameter portion 7 extending into a needle bearing 8 contained within the inner end of a driven shaft 9. The driven shaft 9 is carried by a plurality of ball races 10 mounted within the bore of a stationary sleeve 11 carried upon a coupling supporting bracket 12 and extending along the length of the driven shaft 9. Suitable seal rings 13 are included in the bearing assembly.

The driven shaft 9 carries a runner ring 14 which is attached to a flange 15 upon the inner end of the driven shaft 9 and positioned adjacently to the impeller shell 2. The impeller and runner shells 2 and 14 carry a plurality of the usual radial impeller and runner vanes 15 and 16 respectively and which support the usual ring members 17 and 18, whereby passages for the fluid transmission of power are constituted.

The coupling is housed within an outer shell 19 which at one end follows the contour of the impeller ring and is attached to the central portion of the ring, as by the studs 20, whereby the shell 19 rotates in unison with the driving shaft 4. The opposite end of the shell 19 is rotatably supported upon a bearing and seal ring assembly 21 which is suitably mounted around the assembly of the driven shaft 9 and stationary sleeve 11 and shall be hereinafter explained.

The shell 19 constitutes the fluid reservoir for the coupling, and to transfer fluid from the shell reservoir 22 into the coupling a suitable fluid scooping arrangement is provided within the reservoir. This scooping arrangement consists of a scooping element or unit formed of a pair of conical spaced apart discs 23 and 24 and which are supported by a pair of spaced apart sleeves 25 and 26. The sleeve 25 extends for substantially the length of the stationary sleeve 11 and rides upon a plurality of bearings 27 mounted upon the stationary sleeve 11, the sleeve 25 forming a mounting for the bearings 21 of the shell 22. The conical disc 24 is formed with an extension ring 28 at its periphery and which carries a plurality of radial fluid scooping vanes 29 upon its face, the inner corners of the vanes 29 being attached to the peripheral edge of the conical disc 23 whereby the discs 23 and 24 and sleeves 25 and 26 rotate as a unit. The fluid scooping element is freely mounted upon the bearings 27, and to control its rotative movement a brake band 30 surrounds the outer end of the sleeve 25 and is actuated under movement of a brake handle 31.

The impeller and runner are contained within a freely mounted inner shell 32 which houses the rings 2 and 14. The portion of the inner shell adjacent to the runner ring 14 contains a wall 33 which is spaced apart from the shell wall to form a ring-shaped fluid passage 34. The inner peripheries of the wall 33 and the adjacent wall of the inner shell are belled to form a fluid exit 35 into the reservoir. Fluid entry from the coupling into the passage 34 is controlled by several spaced apart ball check valves 36 arranged within the outer peripheral closure between the two walls of the passage. The inner shell assembly is carried upon a ring 37 supported by a bearing assembly 38 surrounding the sleeve 26. To control the free rotation of the inner shell, a brake band 39 surrounds one end of the ring 37 and is actuated under movement of a brake handle and rod assembly 40.

*Operation*

The coupling as illustrated in the drawing is designed to rotate in a clockwise direction, and when in driving operation, the impeller and runner shells 2 and 14 are rotating in conjunction with the fluid rings within the coupling in the usual manner. The reservoir shell 19 which is attached to the impeller rotates therewith and as the fluid within the coupling centrifugally impinges against the peripheral face of the inner shell 32, such inner shell also rotates. Any fluid contained within the reservoir 22 of the shell 19 will form a centrifugal fluid ring under the influence of the rotative movement of the reservoir and such ring bearing against the vanes 29 of the fluid scooping element will cause such element to also rotate, it being therefore understood that under full load all the rotatable units of the coupling will be revolving.

If it is desired to remove all or part of the fluid from the coupling, the brake 40 is applied to retard the rotative movement of the inner shell 32. As soon as the speed of rotation of the inner shell 32 substantially falls below the rotative speed of the impeller, the impeller will act in the capacity of a centrifugal pump and force fluid from the coupling through the check valves 36 into the passage 34 and from thence into the reservoir 22. By stopping the rotation of the inner shell 32, the fluid may be instantly evacuated from the coupling.

To pump fluid from the reservoir into the coupling, the driving shaft 4, impeller 2 and reservoir housing 19 being rotating, the brake 31 is applied to retard or stop rotation of the scooping element whereby its vanes 29 will scoop fluid from the centrifugal fluid ring in the reservoir 22 and transfer it through the passage 41 between the discs 23 and 24 and sleeves 25 and 26 into the inner portion of the shell 32 from where it will enter the coupling through suitably positioned fluid inlet orifices 42 within the inner periphery of the runner shell 14. To assist the vanes 29 in their fluid scooping action, radial vanes 43 are positioned upon the face of the shell 19 adjacently to the vanes 29.

From the foregoing description it will be apparent that any desired speed ratio from a full driven speed of the driven shaft down to a standstill and vice versa may be obtained through manipulation of the brakes governing the speed of rotation of the inner shell surrounding the coupling and the speed of rotation of the fluid scooping element in the reservoir, and while the drawing shows a particular arrangement of the invention, it will be understood that I do not confine my invention to the particular construction of features shown but that various other arrangements may be made without departing from the spirit of the invention as set forth in the appended claims.

What I claim as my invention is:

1. In combination with a fluid coupling assembly comprising a driving shaft and an impeller secured thereto, a driven shaft in alignment with the driving shaft and having a runner secured thereto, a rotatable outer shell attached to the driving shaft and constituting a fluid reservoir and within which the impeller and runner are contained, of a freely mounted inner shell positioned within one end of the outer shell and surrounding the impeller and runner, the inner shell comprising a pair of spaced apart walls adjacent to the runner, the space between said walls constituting a check valve controlled fluid outlet passage between the inner shell and the outer shell, a freely mounted rotatable scoop element contained within the outer shell and forming a fluid injection communication between the outer shell and the inner shell, and brake elements controlling the rotative speeds of the inner shell and the scoop element.

2. A combination as defined in claim 1, wherein the entrance to the fluid passage space between the walls is controlled by a plurality of check valves arranged around and in spaced relation to the periphery of the runner.

3. A combination as defined in claim 1, wherein the rotatable scoop element comprises a pair of spaced apart discs rotatable in unison, a plurality of fluid scoop vanes carried by the discs, a pair of spaced apart sleeves surrounding the driven shaft and extending from the outer shell into the inner shell and upon which the scoop element discs are carried, the spaces between the discs and the sleeves constituting the fluid injection communication between the outer shell and the inner shell.

4. A combination as defined in claim 1, wherein the rotatable scoop element comprises a pair of spaced apart discs rotatable in unison, one disc being of greater diameter than the other disc and carrying a plurality of fluid scoop vanes upon its face, a pair of spaced apart sleeves surrounding the driven shaft and extending from the outer shell into the inner shell and to which the scoop element discs are respectively attached, the spaces between the discs and the sleeves constituting the fluid injection communication between the outer shell and the inner shell.

5. A combination as defined in claim 1, wherein the rotatable scoop element comprises a pair of spaced apart discs rotatable in unison, a plurality of fluid scoop vanes carried by the discs, a pair of spaced apart sleeves surrounding the driven shaft and extending from the outer shell into the inner shell and upon which the scoop element discs are carried, the spaces between the discs and the sleeves constituting the fluid injection communication between the outer shell and the inner shell, and wherein the entrance to the fluid passage space between the walls is controlled by a plurality of check valves arranged around and in spaced relation to the periphery of the runner.

6. A combination as defined in claim 1, wherein the rotatable scoop element comprises a pair of spaced apart discs rotatable in unison, one disc being of greater diameter than the other disc and carrying a plurality of fluid scoop vanes upon its face, a pair of spaced apart sleeves surrounding the driven shaft and extending from the outer shell into the inner shell and to which the scoop element discs are respectively attached, the spaces between the discs and the sleeves constituting the fluid injection communication between the outer shell and the inner shell, and wherein the entrance to the fluid passage space between the walls is controlled by a plurality of check valves arranged around and in spaced relation to the periphery of the runner.

JOHN EDWARD BECKER.

References Cited in the file of this patent

UNITED STATES PATENTS

| Number | Name | Date |
|---|---|---|
| 1,859,607 | Sinclair | May 24, 1932 |
| 2,187,656 | Kiep et al. | Jan. 16, 1940 |
| 2,436,034 | Buehler | Feb. 17, 1948 |
| 2,539,004 | Becker | Jan. 23, 1951 |
| 2,548,857 | Becker | Apr. 17, 1951 |